United States Patent [19]

Bellasio et al.

[11] 3,915,968

[45] Oct. 28, 1975

[54] TRIAZOLOPYRIDAZINES

[75] Inventors: Elvio Bellasio, Como; Ambrogio Campi, Monza, Milan, both of Italy

[73] Assignee: Gruppo Lepetit S.p.A., Milan, Italy

[22] Filed: Sept. 21, 1973

[21] Appl. No.: 399,661

[52] U.S. Cl.. 260/247.5 DP; 260/250 AC; 424/248; 424/250
[51] Int. Cl.² ..................................... C07D 237/26
[58] Field of Search ............ 260/247.5 DP, 250 AC

[56] References Cited
FOREIGN PATENTS OR APPLICATIONS
1,248,409  11/1960  France ............................ 260/247.5

OTHER PUBLICATIONS
Lundina et al., Izv. Ahad. Nauk. SSSR Ser. Khim, 1967 (1), 66–70 – abstract only – C.A. Vol. 67, 21884q.

*Primary Examiner*—Anton H. Sutto
*Assistant Examiner*—Richard D. Kelly
*Attorney, Agent, or Firm*—Maynard R. Johnson

[57] ABSTRACT

Triazolopyridazine compounds such as 8-methyl-6-morpholino-s-triazolo[4,3-b]pyridazine or 3,8-dimethyl-6-piperidino-s-triazolo[4,3-b]pyridazine are prepared by the reaction of a 3-hydrazino pyridazine with a lower alkanoic acid. The compounds are useful as hypotensive agents, and certain of the compounds are also active as bronchodilators.

7 Claims, No Drawings

TRIAZOLOPYRIDAZINES

BACKGROUND OF THE INVENTION

The compounds of the invention can be prepared by methods analogous to those described by Pollak et al., Tetrahedron 22, 2073 (1966), Miller and Rose, J. Chem. Soc. 1963, 5642, Basu and Rose, J. Chem. Soc. 1963, 5660 (1963), and Davies et al., Nature, 234, 50 (1971).

SUMMARY OF THE INVENTION

The present invention relates to new pharmacologically active heterocyclic compounds. More particularly the invention relates to substituted S-triazolo[4,3-b]-pyridazines corresponding to the formula

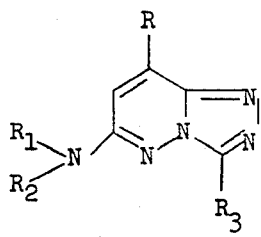

I wherein R and $R_3$ each independently represent hydrogen or a lower alkyl group, with the proviso that at least one of R and $R_3$ represents lower alkyl, and $R_1$ and $R_2$ represent hydroxy-lower alkyl groups or taken together with the nitrogen atom represent a heterocyclic ring selected from pyrrolidine, piperidine, piperazine and morpholine, and their pharmacologically-acceptable salts. Ordinarily the lower alkyl groups have 1 to 4 carbon atoms and may be straight or branched. The hydroxy lower alkyl radicals have from 2 to 4 carbon atoms. A preferred group of compounds comprises those corresponding to Formula I wherein R and $R_3$ are methyl or hydrogen and $R_1$ and $R_2$ together with the nitrogen atom form a piperidine or a morpholine ring.

The 3,6,8-suubstituted-s-triazolo[4,3-b]pyridazine compounds of the above formula and their pharmacologically-acceptable salts have useful biological activity on the circulatory system and in the same time they have a low toxicity.

As employed herein, the phrase "pharmacologically acceptable salt" refers to salts of the triazolopyridazines, the anions of which are relatively non-toxic and innocuous to mammals at dosages consistent with good biological activity so that side effects ascribable to the anions do not vitiate the beneficial effects of the triazolopyridazine compounds. Suitable pharmacologically-acceptable salts which can be employed in the method and composition of the invention can be prepared by conventional procedures.

For the purpose of brevity, such compounds will be hereinafter referred to as "triazolopyridazines". The triazolopyridazine compounds wherein $R_1$ and $R_2$, together with the nitrogen atom, represent morpholino or piperidino have been found to block histamine-induced bronchial spasm, and are also active in blocking the effects of serotonin and acetylcholine.

The compounds of the invention are prepared by reacting a substituted 3-hydrazinopyridazine compound of the formula

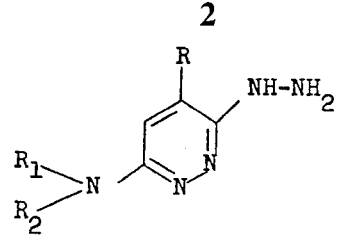

II wherein R, $R_1$ and $R_2$ have the same significance as set out above, with an excess of a lower alkanoic acid of the formula $R_3COOH$, wherein $R_3$ has the significance set out above. The reaction proceeds when the reactants are contacted and mixed, preferably at the boiling temperature of the reaction mixture under reflux. The product is obtained as a pharmacologically-acceptable salt with the lower alkanoic acid reactnat by conventional procedures such as evaporation. It is conveniently purified by treatment with excess base, such as aqueous or alcoholic alkali metal carbonate or hydroxide to liberate the free base, followed by conventional purification techniques.

In a convenient general procedure, the starting hydrazine compound of Formula II is employed as a mineral acid salt. One part by weight of the 3-hydrazinopyridazine reactant is dissolved in 5 to 15 parts of 99 percent lower alkanoic acid, which in this case also acts as a solvent and reaction medium. The mixture is refluxed for 1 to 3 hours. The product is recovered by evaporation in vacuo to dryness, and the residue is triturated with an aqueous sodium bicarbonate solution and extracted with an organic solvent which is preferably selected from the chlorinated lower hydrocarbons. The obtained products are then crystallized from lower alkanols.

When the starting 3-hydrazinopyridazine of Formula II is one in which $R_1$ and $R_2$ represent hydroxy lower alkyl groups, the reaction leads to the corresponding compounds of Formula I wherein $R_1$ and $R_2$ are lower-alkylcarbonyloxy lower alkyl groups. In this case an acid hydrolysis gives the corresponding compounds where $R_1$ and $R_2$ are hydroxy lower alkyl radicals. The compounds are white solids, fairly soluble in the most common organic solvents such as lower alkanols, dioxane and ethyl acetate. In some instances they are also quite soluble in water. The compounds can be also easily dissolved in aqueous acid solutions due to the presence of a basic substituent in position 6, and can be readily converted to various pharmacologically acceptable salts by conventional procedures.

The following examples illustrate the invention:

EXAMPLE 1

8-Methyl-6-piperidino-s-triazolo[4,3-b]pyridazine

A mixture of 20 grams of 3-hydrazino-4-methyl-6piperidinopyridazine in 100 milliliters of aqueous 99 percent formic acid was heated at the boiling temperature under reflux for 3 hours and then evaporated to dryness. The residue, containing 8-methyl-6-piperidino-s-triazolo-[4,3-b]pyridazine formate was taken up in excess aqueous sodium carbonate and extracted with chloroform. After evaporation of the chloroform solvent the title compound was crystallized from ethyl acetate. Yield 4.4 g. M.p. 118°–120°C.

EXAMPLE 2

8-Methyl-6-morpholino[4,3-b]pyridazine

A mixture of 20 grams of 3-hydrazino-4-methyl-6-morpholinopyridazine in 200 milliliters of 99 percent formic acid was refluxed to dryness. The oily residue containing 8-methyl-6-morpholino[4,3-b]pyridazine formate was treated with an aqueous solution of sodium carbonate and extracted with chloroform. The organic solution was dried with anhydrous sodium sulfate, and then evaporated in vacuo. The residual organic solid was twice crystallized from isopropanol to obtain 6.5 grams of the title compound melting at 177°–180°C.

EXAMPLE 3

6-Bis(2-hydroxyethyl)amino-8-methyl-s-triazolo[4,3-b]pyridazine hydrochloride A mixture of 30 grams of 6-bis(2-hydroxyethyl)-amino-4-methyl-3-hydrazinopyridazine dihydrochloride and 80 grams of 10 percent sodium hydroxide in 200 milliliters of 99 percent formic acid was refluxed for 3 hours and then evaporated to dryness. The residue was mixed with 200 milliliters of 18 percent HCl. The mixture was refluxed for 2 hours; then concentrated to dryness, giving the title compound. After crystallization from ethanol the product was found to melt at 238°–240°C.

EXAMPLE 4

6-Bis(2-hydroxyethyl)amino-3-methyl-s-triazolo[4,3-b]pyridazine hydrochloride By following the same procedure as in example 3 but employing 6-bis(2-hydroxyethyl)amino-3-hydrazinopy-ridazine dihydrochloride, in the place of 6-bis(2-hydroxyethyl)amino-4-methyl-3-hydrazinopyridazine hydrochloride and acetic acid in the place of formic acid, 6-bis(2-acetoxyethyl)amino-3-methyl-s-triazolo[4,3-b]pyridazine is obtained (m.p. 97°–99°C.) which after hydrolysis with 18 percent HCl gives the title compound melting at 153°–155°C.

EXAMPLE 5

3,8-Dimethyl-6-morpholino-s-triazolo[4,3-b]-pyridazine

5 Grams of 3-hydrazino-4-methyl-6-morpholino-pyridazine are refluxed for two hours in 45 milliliters of acetic acid. The solution is evaporated to dryness and the residue is washed with aqueous sodium bicarbonate and water. The title compound is purified by crystallization from a 1:1 mixture of ethanol:diisopropyl ether and found to melt at 212°–3°C. Yield 4.5 g.

In a similar procedure, 3,8-dimethyl-6-piperidino-s-triazolo[4,3-b]pyridazine is prepared by reacting 3-hydrazino-4-methyl-6-piperidinopyridazine and acetic acid. The product is found to melt at a temperature of 161°–163°C. The compounds of formula I are useful as hypotensive agents as indicated by their activity in anesthesized dogs. In representative examples dogs anesthesized with 35 mg/Kg of sodium pentobarbital and administered by intravenous route with 5 mg/Kg of compounds of examples 1 and 2 exhibited a significant decrease of the blood pressure.

The toxicity of the s-triazolo[4,3-b]pyridazines was found to be very favorable, the acute oral $LD_{50}$ values ranging from 400 to 600 mg/Kg.

Bronchodilator activity of representative triazolopyridazine compounds corresponding to Formula I wherein $R_1$ and $R_2$, together with the nitrogen atom, represent morpholino or piperidino, is examined in the Konzett-Rossler guinea pig preparation according to accepted procedures. See Konzett and Rossler; Arch. f. exp. Path. u. Pharmakol. 195: 71–74 (1940); and Rosenthale and Dervinis, Arch. Int. Pharmacodyn. 172: 91–94 (1968). Test compounds are evaluated by administering a test compound to anesthesized guinea pigs 2 minutes before dosage with an agonist compound (histamine, serotonin or acetylcholine) following three previous agonist doses resulting in relatively uniform (±10 percent) bronchoconstriction.

In such operations, the compounds of Examples 1, 2 and 5 are found to antagonize histamine at intravenous dosage rates of 3 or 10 milligrams per kilogram. The compounds of Examples 1 and 2 are found to give greater than 70 percent blockade of bronchiospasm induced by histamine, serotonin or acetylcholine, at a dosage rate of 10 milligrams per kilogram. The compounds may be administered in oral or parenteral form. They may be compounded into pharmaceutical dosage forms such as tablets, capsules, suppositories or solutions by adding the usual excipients such as starches, gums, sugars, fatty acids, etc., or by dissolving or dispersing them in a parenterally acceptable liquid such as for instance pyrogen free distilled water or propylene glycol or mixtures thereof. The compound of Example 4 has particularly desirable hypotensive activity.

In general satisfactory results are obtained when the compounds are administered to animals at a dosage rate of from about 0.5 to about 50 mg. per Kilogram of body weight per day, preferably in divided dosages.

The starting hydrazinopyridazines of Formula II can be prepared by refluxing the corresponding 6-chloropyridazines with an excess of 98 percent hydrazine hydrate and collecting the precipitate which forms. The free bases can be transformed into the dihydrochlorides by bubbling excess HCl ether solution of the basic compound.

What is claimed is:

1. An s-triazolopyridazine compound selected from the group consisting of compounds corresponding to the formula

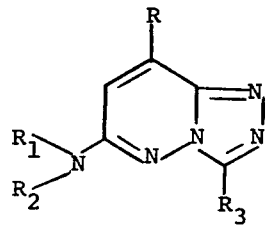

wherein R and $R_3$ each independently represent hydrogen or a lower alkyl group, with the proviso that at least one of R and $R_3$ represents a lower alkyl group, $R_1$ and $R_2$ taken together with the nitrogen atom represent a heterocyclic ring selected from pyrrolidine, piperidine, piperazine and morpholine; and the pharmacologically acceptable salts thereof.

2. A compound of claim 1 wherein the lower alkyl groups are selected from methyl and ethyl groups.

3. A compound of claim 2 wherein R and $R_3$ are methyl or hydrogen and wherein $R_1$ and $R_2$ taken together with the nitrogen atom represent a morpholine or piperidine ring.

4. A compound of claim 3 wherein $R_3$ is hydrogen and R is methyl.

5. A compound of claim 4 wherein $R_1$ and $R_2$ taken together with the nitrogen atom, represent morpholino.

6. A compound of claim 4 wherein $R_1$ and $R_2$ taken together with the nitrogen atom, represent piperidino.

7. A compound of claim 1 wherein $R_1$ and $R_2$ represent 2-hydroxyethyl, R is hydrogen and $R_3$ is methyl.

* * * * *

UNITED STATES PATENT AND TRADEMARK OFFICE
CERTIFICATE OF CORRECTION

PATENT NO. : 3,915,968
DATED : October 28, 1975
INVENTOR(S) : Elvio Bellasio; Ambrogio Campi It is certified that error appears in the above-identified patent and that said Letters Patent are hereby corrected as shown below:

Column 1, line 42, "3,6,8-suubstituted-s-triazolo[4,3-b]-pyridazine" should read --3,6,8-substituted-s-triazolo-[4,3-b]pyridazine--;

Column 1, line 47, "pharmacologically" should read --pharmacologically- --;

Column 2, line 59, "6piperidinopyridazine" should read --6-piperidinopyridazine--;

Column 4, line 40, after "HCl" insert --into a diethyl--.

Signed and Sealed this eleventh Day of May 1976

[SEAL]

Attest:

RUTH C. MASON
Attesting Officer

C. MARSHALL DANN
Commissioner of Patents and Trademarks